United States Patent
Geck et al.

[15] 3,669,434
[45] June 13, 1972

| [54] | APPARATUS FOR MELTING PARTICULATE METAL |
|---|---|
| [72] | Inventors: Gunter Geck; Hans Jurgen Langhammer, both of Hagen, Germany |
| [73] | Assignee: Klockner-Werke AG, Duisburg, Germany |
| [22] | Filed: Jan. 13, 1971 |
| [21] | Appl. No.: 106,127 |

Related U.S. Application Data

[62] Division of Ser. No. 862,762, Oct. 1, 1969.

[30] Foreign Application Priority Data

Oct. 2, 1968  Germany...................P 18 00 610.5

[52] U.S. Cl............................................266/33 S, 266/34 L
[51] Int. Cl...............................................................C21c 5/00
[58] Field of Search..................239/132.3; 266/33 R, 33 S, 266/34 L, 34 LM

[56] References Cited

UNITED STATES PATENTS

| 2,886,304 | 5/1959 | Guthrie | 266/33 R |
| 295,502 | 3/1884 | Morgan et al. | 266/33 R |
| 623,762 | 4/1899 | Bishop | 266/33 R |
| 1,713,543 | 5/1929 | Machlet | 266/33 R |
| 2,337,072 | 12/1943 | Tarbox | 266/33 R |
| 2,624,565 | 1/1953 | Kompart | 266/33 R |
| 3,169,161 | 2/1965 | Kurzinski | 266/34 L |
| 3,199,977 | 8/1965 | Phillips et al. | 266/33 R |
| 3,234,010 | 2/1966 | Mahany | 266/33 R |
| 3,367,769 | 2/1968 | Schott | 266/33 R |

Primary Examiner—Gerald A. Dost
Attorney—Michael S. Striker

[57] ABSTRACT

An upright elongated in part refractory lined melting chamber in which a charge of particulate metal is melted by the flame of a lance such that the metal of the charge melts and flows onto the bottom wall of the chamber and thereby becomes interposed between the flame and the bottom wall, whereby the bottom wall is protected from the flame of the interposed metal. An outlet is provided beneath the flame for evacuating the melted metal from the melting chamber.

10 Claims, 3 Drawing Figures

APPARATUS FOR MELTING PARTICULATE METAL

CROSS REFERENCE TO RELATED APPLICATIONS

This application is a division of my copending application Ser. No. 862,762 entitled "Method and Apparatus for Melting Particulate Metal" and filed Oct. 1, 1969.

BACKGROUND OF THE INVENTION

The present invention relates to an apparatus for melting metal scrap, in particular steel scrap, and the subsequent conversion of the melted metal into steel.

Already known in the art is an apparatus for melting or remelting particulate metal.

According to a known method, particulate metal is introduced and melted in a melting furnace, such as a Siemens Martin furnace or an electric furnace, in which the degree of heat exploitation is relatively low, for example 35 percent in a Siemens Martin furnace, which is caused by the decreasing temperature differential between the charge and the flame during progress of the melting process. A further reason is the poor utilization and the heat losses which result from the spatial arrangement of the melting flames with regard to the scrap metal.

As regards Cupola furnaces, they have no real bearing on the subject invention in that instead of subjecting pure particulate metal to combustion in the furnace, the metal scrap admitted into the Cupola furnace already contains the fuel requisite for the melting of the scrap metal.

Generally speaking, and in accordance with conventional melting practices, the metal scrap is melted by means of a flame directed from above onto the metal. This, however, has the inherent disadvantage that in response to increase of the melting time, the heat transfer between the flame and the charge becomes poorer, even to the extent that in certain extremes, a stationary condition sets in between the flame and the upper layer of the charge with the result that the lower layers remain predominantly unmelted and untouched by the heat of the flame.

Also known are furnaces in which the melting chamber consists at least in part of a refractory material and in which the charge is heated and melted by means of a flame or other kind of heat radiation which passes over the power surfaces of the charge and/or is reflected by the roof of the furnace onto the top layer of the charge so as to obtain a substantially overall equal penetration of heat into the charge.

This, however, has the disadvantage, that not only the charge is subjected to the heat but also the refractory material with which the melting chamber is either entirely or in part provided, which leads to excessive stress of the refractory material which negatively influences the operation of the furnace, especially at high temperatures.

In addition, such furnaces are extremely complicated as regards their construction and uneconomical as regards their operation and maintenance.

SUMMARY OF THE INVENTION

An object of the present invention is to provide an apparatus for melting particulate material according to which the charge is uniformly melted and subsequently converted into steel.

A further object of the present invention is to provide an apparatus for melting particulate material and which is arranged so that a minimum of refractory material is needed, and which refractory material is protected from the flame, which improves the economy and operation of the apparatus.

Such an apparatus according to the present invention comprises an upright in part refractory lined elongated chamber in which a charge of particulate material is melted by the flame of a lance such that the metal of the charge melts and flows onto the bottom wall of the chamber and thereby becomes interposed between the flame and the bottom wall, whereby the bottom wall is protected from the flame of the interposed metal. An outlet is provided beneath the flame for evacuating the melted metal from the melting chamber.

The novel features which are considered as characteristic for the invention are set forth in particular in the appended claims. The invention itself, however, both as to its construction and its method of operation, together with additional objects and advantages thereof, will be best understood from the following description of specific embodiments, when read in connection with the accompanying drawings.

DESCRIPTION OF THE PREFERRED EMBODIMENTS

Figure 1:
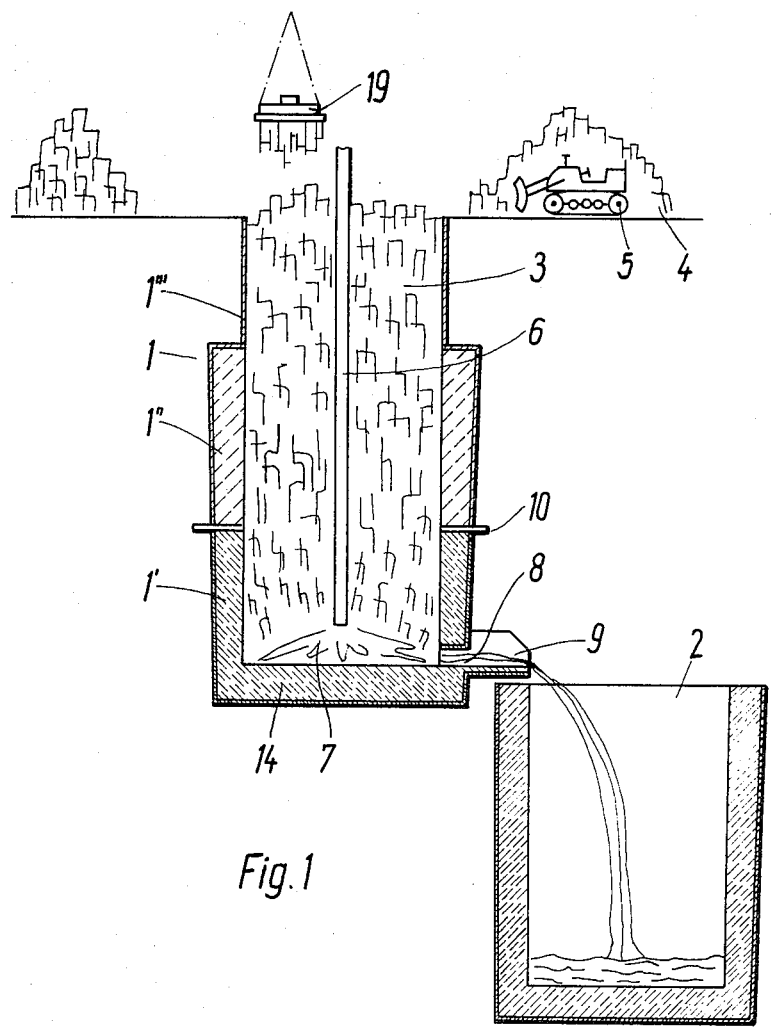
FIG. 1 is a cross-sectional view of a melting apparatus according to the present invention.

Referring now to the drawings in which like reference numerals index like parts, and with attention initially directed to FIG. 1, the melting apparatus 1 for melting particulate material 3 is provided with a receptacle 2 which is fixedly connected to the apparatus 1. The apparatus 1 is in the form of an upright substantially elongated cylindrical shaft which is seen to comprise an open upper end 1a and a closed bottom wall 14.

The particulate metal 3 is admitted into the hollow interior of the shaft 1 in the form of an axially extending column which has an overall uniform outer diameter which is substantially equal to the inner diameter of the shaft.

In the instant embodiment, the particulate material 3 is charged into the shaft from a platform 4 by means of a mobile transport device 5 and a magnet 19.

Extending coaxially with the longitudinal axis of the shaft is a lance 6 which is provided with a lance head 6a from which the melting flame 7 issues. As shown, the lance 6 extends centrally through the charge column 3 while the head thereof 6a opens in a region substantially spaced from the bottom wall 14.

The flame 7 is disc-shaped and is directed against the leading end of the charge 3 by means of a plurality of apertures, not shown, in the head 6a.

The flame 7 extends substantially over the entire surface of the leading end and, due to its shape and its location relative to the bottom wall 14, heats the charge in such a way that the latter melts and flows into the bottom wall 14 and is thereby interposed between the flame and the bottom wall, whereby the bottom wall is protected from the flame of the interposed metal which subsequently is evacuated from the melting chamber via an outlet 8 in the chamber wall 1'. A spout 9 communicates with the outlet 8 so as to convey the melted metal into the receptacle 2.

As shown, the shaft 1 consists of three sections 1', 1'' and 1''', respectively. The lower section 1' comprises a lining made of a basic refractory material while the center section 1'' comprises a lining of fire bricks for reasons that the heat impact on this center section is essentially smaller than on the lower section 1'. The upper section 1''' does not comprise a fire resistant lining for reasons that the heat impact in this section is totally negligible.

The lower section 1' is exchangeable by means of the flange connection 10.

Figure 2:
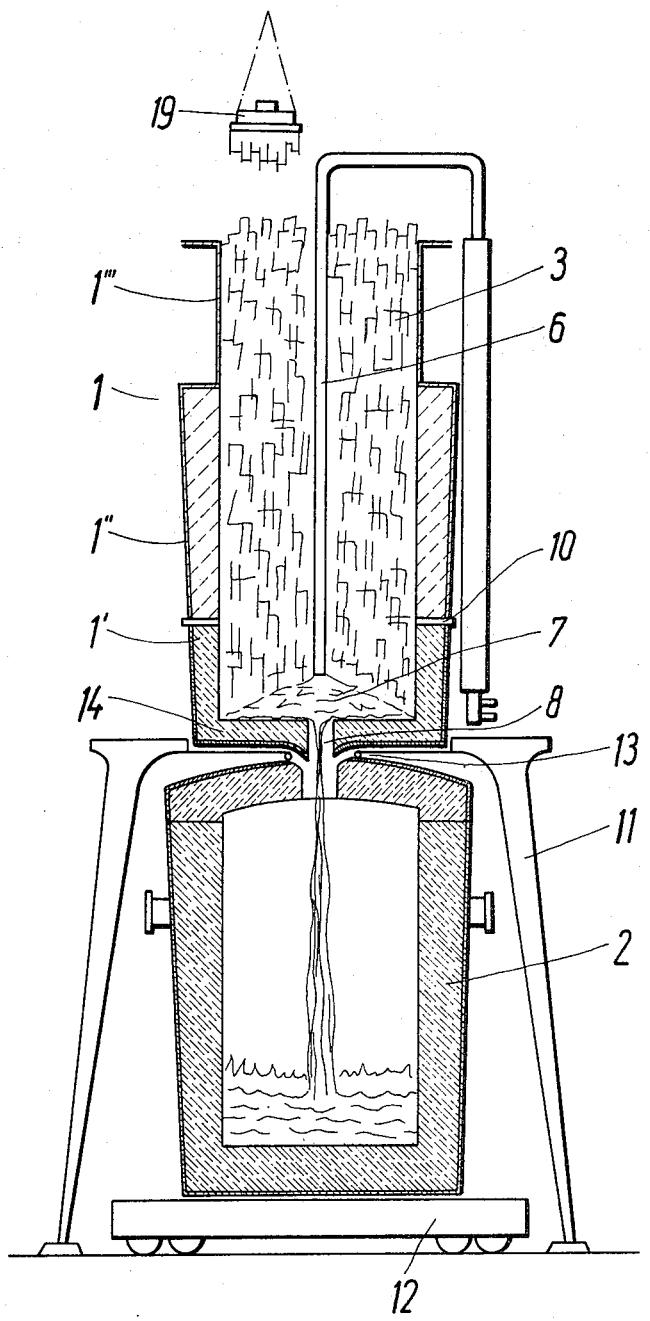
FIG. 2 is a further embodiment of the apparatus of FIG. 1.

FIG. 2 shows the shaft and melting arrangement of FIG. 1, however, arranged with an exchangeable receptacle 2 which is movable on the support 12 and which communicates with the shaft 1 via an opening 8 which is centrally arranged in the bottom wall 14. The shaft 1 itself is supported on a support 11 and the space intermediate the bottom wall 14 and the upper portion of the receptacle 2 is filled by a filling member or gasket 13.

Figure 3:
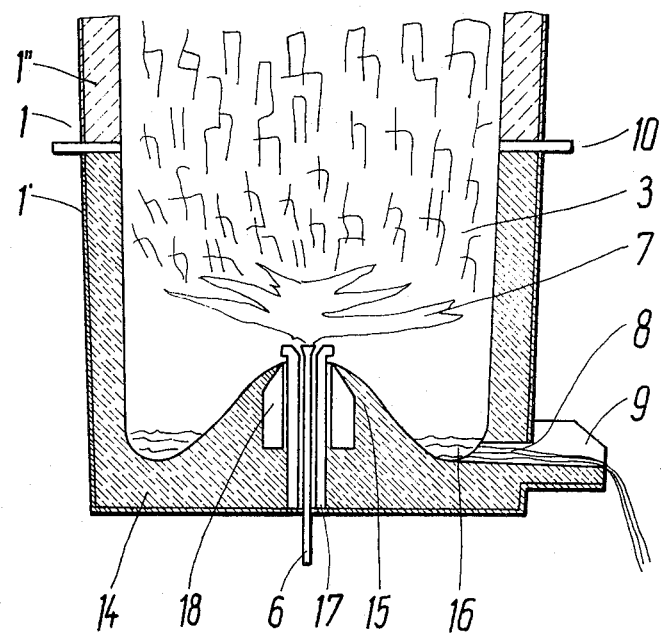
FIG. 3 is a part cross-sectional view of a still further embodiment of the apparatus of FIG. 1.

Shown in FIG. 3 is a still further embodiment of the apparatus of FIG. 1, and in which the bottom wall 14 comprises a central opening in which the lance 6, which in this instance extends through the bottom wall 14, is supported and guided by a rod shaped member 17.

Surrounding the member 17 is an upwardly directed projection 15 which, in turn is surrounded by a trough-shaped groove 16 for the collection of melted metal. The groove 16 communicates with a discharge opening 8 and a spout 9 for evacuating the melted metal from the shaft 1.

Also surrounding the lance 6 and the guide support 17 is a cooling chamber 18 which is operative to cool excessive heat of the lance 6 by means of cooling water circulated through the cooling chamber.

The apparatus of FIG. 1 further comprises means, not shown, for varying the supply of combustion supporting oxygen in an amount requisite for the conversion of the particulate metal into steel.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An apparatus for melting particulate metal comprising means defining an upright elongated melting chamber having a substantially uniform diameter over the whole length thereof and a bottom wall; admitting means for admitting a charge of particulate metal into said melting chamber; heating means for directing a disc-shaped flame extending substantially over the entire surface of the leading end of said particulate metal into contact with said leading end so that the metal of said charge melts and flows onto said bottom wall, thereby becoming interposed between said flame and said bottom wall, and protecting the latter from the former; and outlet means for evacuating the melted metal from said melting chamber.

2. An apparatus for melting particulate metal comprising means defining an upright melting chamber having a longitudinal axis and a bottom wall; admitting means for admitting a charge of particulate metal into said melting chamber; heating means including a lance extending coaxially with said longitudinal axis for directing a flame into contact with the leading end of said particulate metal so that the metal of said charge melts and flows onto said bottom wall, thereby becoming interposed between said flame and said bottom wall, and protecting the latter from the former; and outlet means for evacuating the melted metal from said chamber.

3. An apparatus as defined in claim 2, wherein said lance comprises a lance head including a plurality of orifices for directing said flame into contact with said leading end of said particulate metal.

4. An apparatus as defined in claim 2, wherein said heating means includes a guide support surrounding said lance at least in the region of the leading end thereof.

5. An apparatus as defined in claim 2, wherein said lance extends through said top of said melting chamber.

6. An apparatus as defined in claim 2, wherein said lance extends through said bottom wall od said melting chamber.

7. An apparatus as defined in claim 2, wherein said lance includes a lance head positioned in substantially spaced apart relationship with said bottom wall.

8. An apparatus as defined in claim 6, wherein said bottom wall includes an upwardly directed projection concentrically surrounding said lance, and a groove surrounding said projection for accumulating said molten metal.

9. An apparatus as defined in claim 8, wherein said groove is trough-shaped, and wherein said outlet means communicates with said trough-shaped groove.

10. An apparatus as defined in claim 8, wherein said projection includes an annular cooling chamber concentrically surrounding said lance.

* * * * *